United States Patent [19]

Janer

[11] Patent Number: 5,416,803
[45] Date of Patent: May 16, 1995

[54] PROCESS FOR DIGITAL TRANSMISSION AND DIRECT CONVERSION RECEIVER

[75] Inventor: Patrick Janer, Levallois-Perret, France

[73] Assignee: Alcatel Telspace, Nanterre Cedex, France

[21] Appl. No.: 64,074

[22] PCT Filed: Sep. 25, 1992

[86] PCT No.: PCT/FR92/00895
§ 371 Date: May 20, 1993
§ 102(e) Date: May 20, 1993

[87] PCT Pub. No.: WO93/06677
PCT Pub. Date: Jan. 4, 1993

[30] Foreign Application Priority Data

Sep. 26, 1991 [FR] France ............... 91 11855

[51] Int. Cl.$^6$ ............... H04L 27/14; H04L 27/16; H04L 27/22
[52] U.S. Cl. ............... 375/324; 375/344; 331/1 A; 329/325; 329/336
[58] Field of Search ............... 375/80, 94, 97, 120, 375/81; 455/214; 331/25, 1 R, 1 A; 329/325, 336; 332/127, 128, 129

[56] References Cited

U.S. PATENT DOCUMENTS

| | | | |
|---|---|---|---|
| 4,879,728 | 11/1989 | Tarallo | 375/97 |
| 5,140,284 | 8/1992 | Petersson et al. | 331/25 |
| 5,150,384 | 9/1992 | Cahill | 375/97 |
| 5,283,780 | 2/1994 | Shuchman et al. | 375/97 |

FOREIGN PATENT DOCUMENTS 0094040 11/1983 European Pat. Off. .
0123587 10/1984 European Pat. Off. .

OTHER PUBLICATIONS

Microwave Journal, vol. 33, No. 4, Apr. 1990, Dedham US, pp. 255–264, Surinder Kumar: "Directly modulated VSAT transmitters".

Primary Examiner—Stephen Chin
Assistant Examiner—Don N. Vo
Attorney, Agent, or Firm—Sughrue, Mion, Zinn, Macpeak & Seas

[57] ABSTRACT

The transmitter uses a synthesized oscillator (1A) whose reference (24) is provided by the clock (H) of the data (P, Q). The demodulation oscillator (13A) of the receiver is a synthesizer which is functionally identical to that (1A) of the transmitter, and its reference (23) is provided by the clock (H, 36) recovered from the received data.

3 Claims, 4 Drawing Sheets 14,416,803

PROCESS FOR DIGITAL TRANSMISSION AND DIRECT CONVERSION RECEIVER

The present invention relates to a digital data transmission system, and more particularly to a telecommunications system by wave or by digital radio beam, said system including a receiver that performs coherent demodulation directly at microwave frequency.

The radio beam is a transmission channel for the data contained in the digital stream. The system includes at least one transmitter and at least one receiver. The modulation generally used is modulation having a plurality of amplitude and phase states, thereby defining a "constellation" having an even number of states in the complex plane.

DESCRIPTION OF THE RELATED ART

A conventional digital transmission system of this type is shown in block diagram form in accompanying FIGS. 1 and 2.

The system uses coherent demodulation, i.e. demodulation that is synchronous with the transmission, said demodulation being performed directly at microwave frequency, i.e. without transposition to an intermediate frequency. FIG. 1 is a diagram showing a portion of the transmitter and FIG. 2 is a diagram showing a portion of the receiver.

The transmitter as shown in FIG. 1 comprises in succession from an upstream end to a downstream end:

A microwave oscillator 1 which may be synthesized or otherwise, and which delivers the transmission carrier frequency on an output terminal 2.

A microwave modulator 3 which receives said carrier frequency from 2 and which also receives in conventional manner data trains P and Q to be transmitted which are delivered in baseband on two modulation inputs 4 and 5.

An amplifier 6 for amplifying the modulated signal obtained at output 7 from the modulator 3, the output signal 8 from said amplifier 6 being applied to an antenna via a transmission filter (not shown) for the purpose of being transmitted towards the receiver.

The receiver as shown in FIG. 2 comprises, in turn:

A low noise amplifier 9 (LNA) having an input 10 that receives the radiofrequency signal from a reception antenna and via a reception filter (not shown).

A microwave demodulator 11 which has an input 12 on which it receives the signal amplified by the amplifier 9.

A voltage controlled oscillator 13 (VCO) for use in performing microwave demodulation, the oscillator having an output 14 connected to the demodulator 11. Since this oscillator is required to have good spectrum purity and low frequency drift, it is generally made using dielectric resonators having a high Q-factor.

A portion 15 performs signal processing in baseband. This portion 15 conventionally includes the following, for example: a low noise amplifier, a lowpass filter, a group propagation delay corrector, and an automatic gain control amplifier (AGC). It processes the two received and demodulated data trains P and Q which are applied thereto via respective input terminals 16 and 17 connected to the demodulator 11, and after processing it provides processed versions of these two data trains P and Q in baseband on output terminals 18 and 19 of said receiver.

A phase estimator 20 operating in baseband receives the two data trains P and Q at the output from the processor device 15 via inputs 21 and 22, and it delivers a phase error signal via an output 23 in the form of a DC voltage which is applied to the control input of the oscillator 13, thereby forming a phase locked loop which tends to cancel any phase difference between the received signal and the reconstituted carrier. In other words, the phase estimator 20 generates a voltage which is a function of the phase error between the recovered carrier and the received carrier. This voltage output on 23 and the phase estimator enables the reception oscillator 13 to be servo-controlled in frequency and in phase, thereby enabling "coherent" demodulation of the received signal.

A conventional installation as described above suffers from the following drawbacks:

The receiver has a narrow passband:

Since the demodulator oscillator 13 must have good spectrum purity and low frequency drift, it cannot have high frequency agility, such that in practice this kind of receiver is in general suitable for receiving a single channel only, thereby considerably limiting the uses to which it can be put.

The system is sensitive to "false-locking":

With coherent demodulation, false-locking can occur at frequencies that are situated on either side of the carrier frequency at multiples of one-fourth of the digital data rate when modulation is performed on two axes in quadrature, as in the case under consideration. The carrier recovery system must thus necessarily include a device for detecting and for correcting such false-locking. A particular result is that it is almost impossible to use direct demodulation either at very low digital data rates or else whenever frequency-agile receivers are required.

These problems could, in theory, be overcome by using a frequency synthesizer for the demodulation oscillator. However, in the present case of direct demodulation, the oscillator of such a synthesizer would need to be servo-controlled simultaneously by its own reference (generally a quartz crystal) and by the voltage from the phase estimator, which is naturally incompatible. As a result, in the past, it has unfortunately not been possible to use frequency synthesizers when performing direct demodulation at microwave frequencies.

SUMMARY OF THE INVENTION

The invention seeks to remedy these drawbacks. To this end, the invention provides a digital data transmission system, in particular by means of a microwave radio beam, said system comprising firstly at least one transmitter of digital data on a microwave carrier and secondly at least one receiver that performs coherent demodulation directly at microwave frequency. According to the invention, firstly the transmitter uses a first frequency synthesizer to generate the carrier frequency, the reference for the synthesizer being provided by the clock frequency of the digital stream to be transmitted. Secondly, the receiver uses another frequency synthesizer as its demodulation oscillator, said other frequency synthesizer being at least functionally identical to the first frequency synthesizer and having its reference provided in similar manner by the clock frequency recovered from the received digital stream, the frequency of said demodulation oscillator thus being identical to said transmission carrier frequency and being synchronous therewith. An auxiliary phase offset circuit being provided, if necessary, between the output from said demodulation oscillator and the corresponding control input of the demodulator in order to compensate for any phase offsets that may be generated by the receiver, in particular by its loop circuit.

BRIEF DESCRIPTION OF THE DRAWINGS

In any event, the invention will be well understood and its advantages and other characteristics will appear on reading the following description of a non-limiting embodiment of such a digital data transmission system, described with reference to the accompanying diagrammatic drawings, in which.

DETAILED DESCRIPTION OF THE PREFERRED EMBODIMENTS

Figure 1:
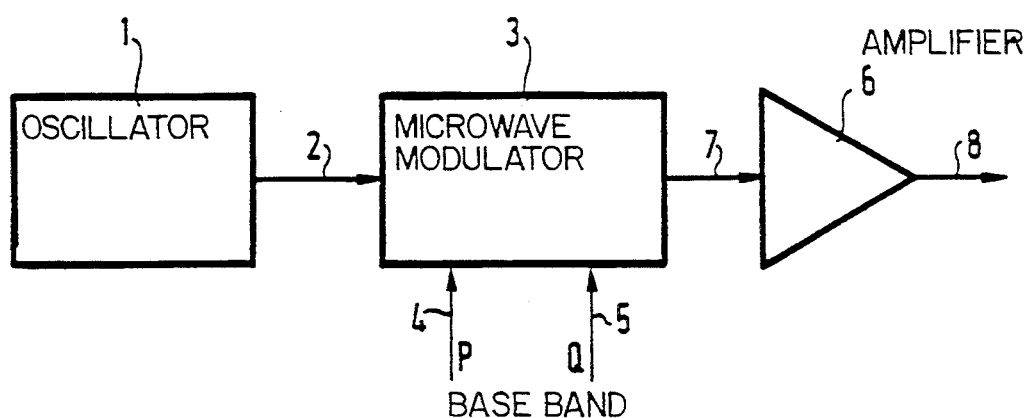
FIG. 1 is a block diagram of a conventional transmitter.
Figure 3:
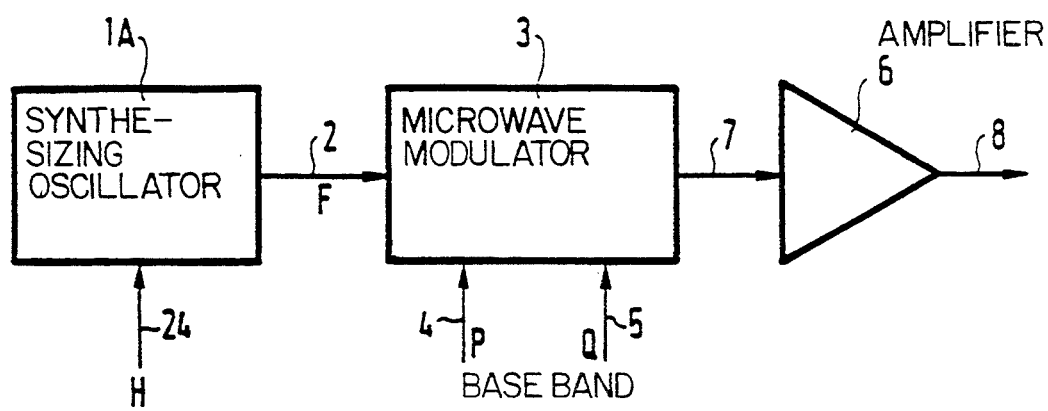
FIGS. 3 and 4 are block diagrams, respectively, of the transmitter and of the receiver in one example of a system for digital telecommunications by radio beam.

Reference is now made to FIG. 3 which should be compared closely to above-described FIG. 1. The transmitter of the radio beam includes the same modulator 3 and amplifier 6 as the transmitter of FIG. 1, however its synthesized oscillator 1A or "frequency synthesizer", has an input 24 receiving a reference in the form of the clock signal H of the binary stream to be transmitted, and more precisely at a submultiple of said clock frequency H, as now described with reference to FIG. 5.

Figure 5:
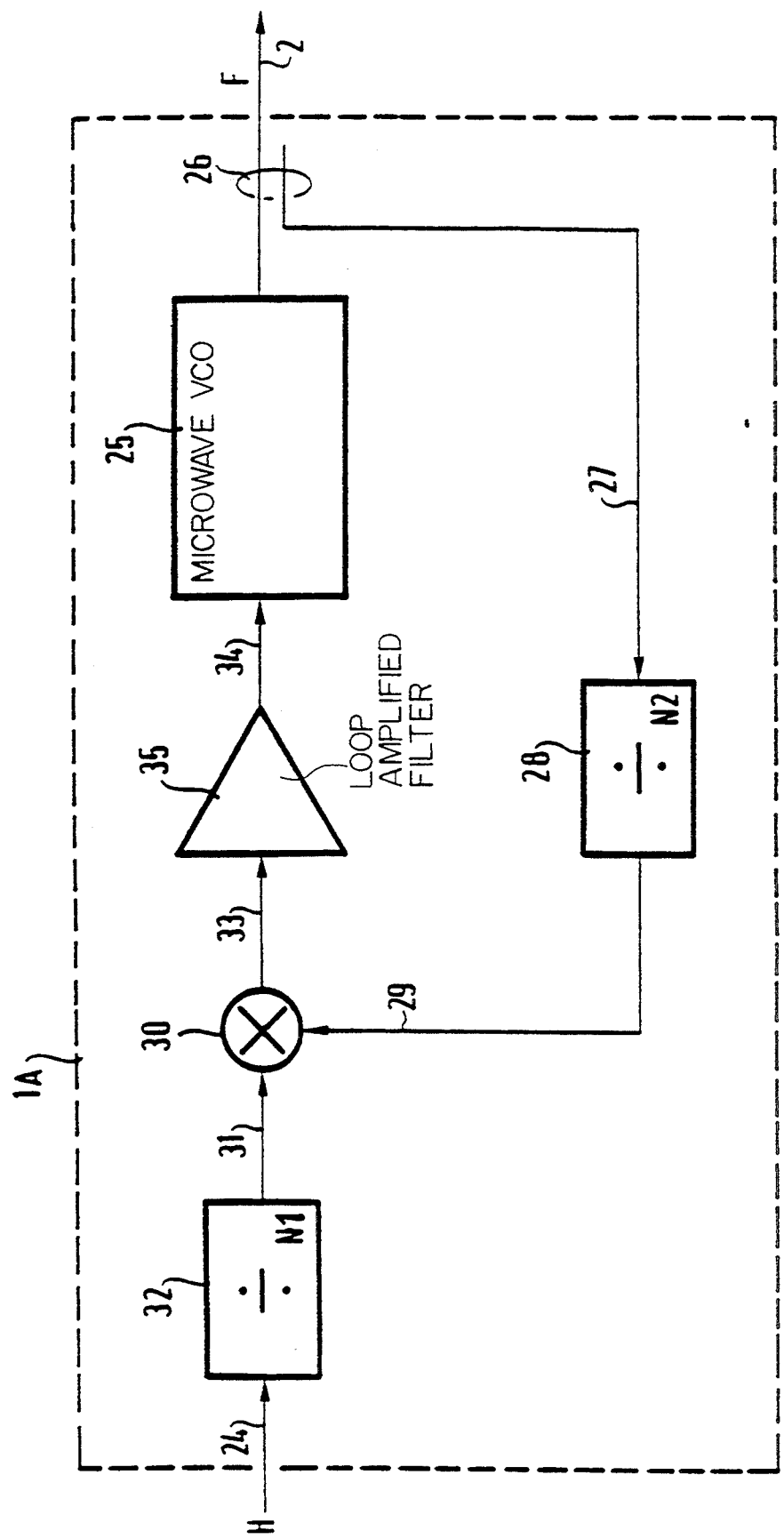
FIG. 5 is a block diagram of the synthesized oscillator as used both in the transmitter and in the receiver.

One possible embodiment of such a synthesized oscillator 1A is described purely by way of example with reference to FIG. 5, it being understood that given the large number of types of frequency synthesizer presently known, this example is not limiting in any way.

The frequency synthesizer comprises a voltage controlled oscillator 25 (VCO) operating at microwave frequency and delivering the microwave signal that constitutes the radiofrequency carrier F on an output 2.

A portion of the output signal is picked up by a coupler 26 and travels around a loop 27 that conventionally includes an adjustable divider 28 for dividing by N2.

The loop signal is applied to one of two inputs 29 of a phase comparator 30 whose other input 31 receives the clock frequency H, i.e. the frequency that gives the binary data rate, which is input at 24 and is divided by means of an adjustable divider 32 that divides by N1.

The error signal 33 output by the phase comparator 30 is applied to the control input 34 of the oscillator 25 after passing through a loop amplifier/filter 35.

The carrier frequency F is thus set by the digital data rate clock H, and more precisely has the value:

$$F = H \times N2/N1$$

Figure 2:
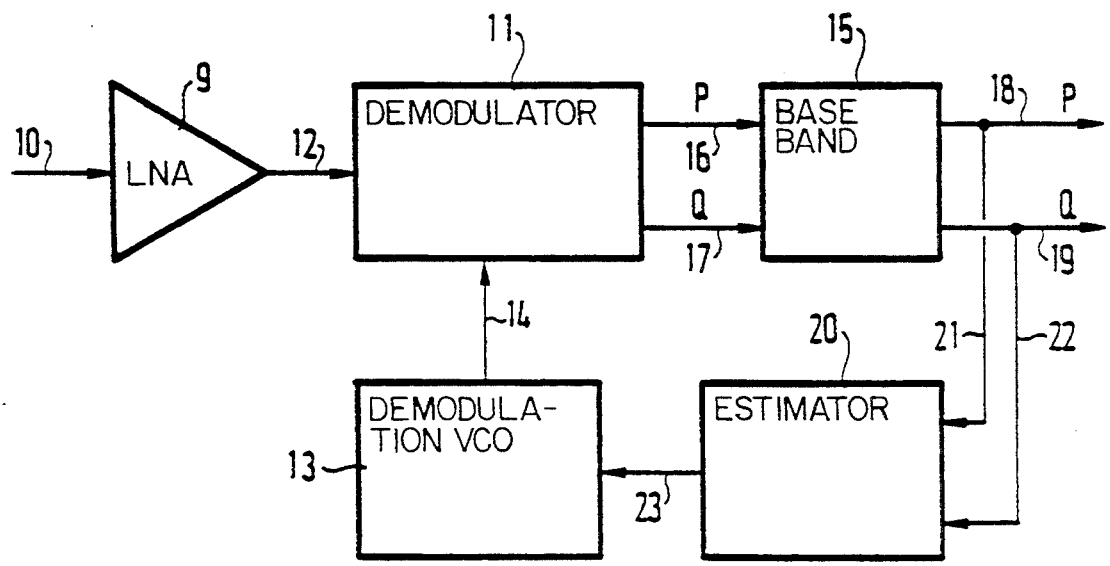
FIG. 2 is a block diagram of a conventional receiver.
Figure 4:
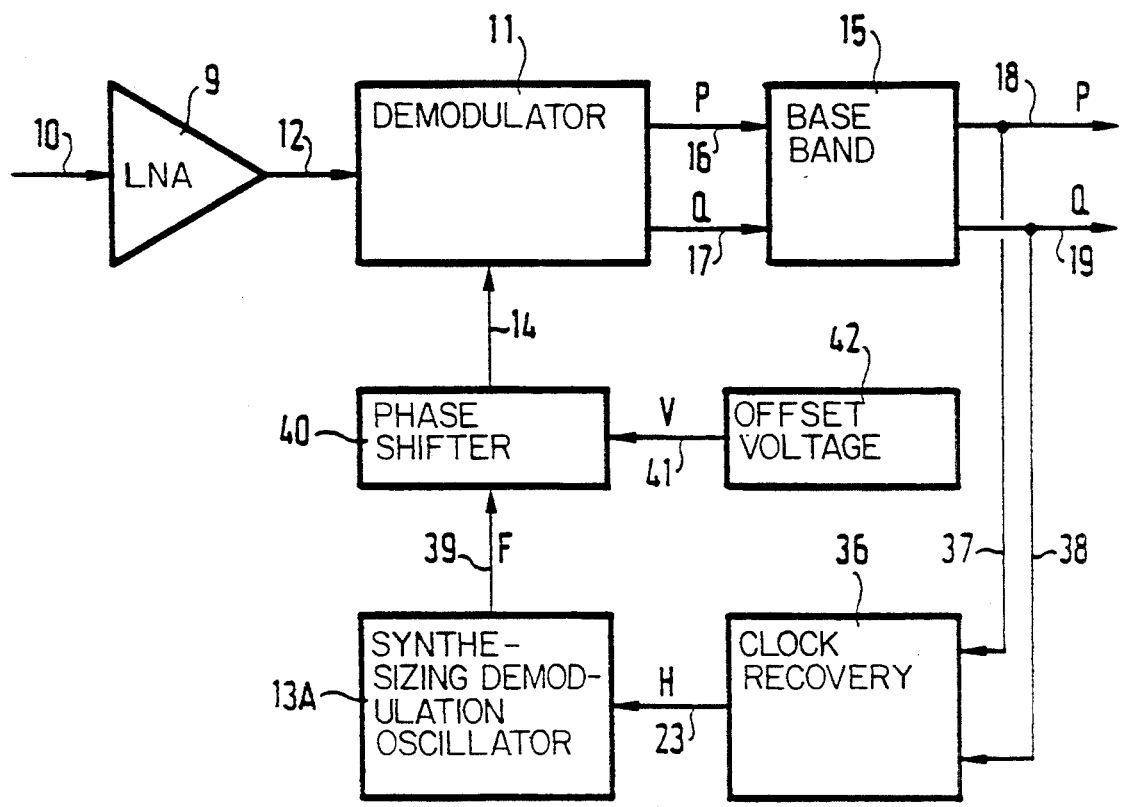

With reference now to FIG. 4 which should be compared with above-described FIG. 2, the receiver can be seen to possess the same amplifier 9, damodulator 11, and baseband processor device 15 as the receiver shown in FIG. 2.

In contrast, and in accordance with the invention, its demodulation oscillator 13A is constituted by a frequency synthesizer identical to the oscillator 1A used for transmission, i.e. dividing by the same numbers N1 and N2 as mentioned above.

The reference that this oscillator 13A receives via its input 23 is constituted by the clock frequency H as recovered from the digital stream by means of a conventional clock recovery circuit 36 having two inputs 37 and 38 on which it receives the demodulated data P and Q after baseband processing, which two data trains are present on outputs 18 and 19 of this receiver block diagram. The clock frequency H is identical to the transmission clock frequency.

The frequency that is obtained at the output 39 of said oscillator 13A is thus necessarily identical to the transmission radiofrequency F, and it is synchronous therewith, since it is governed by the recovered clock H. The above-mentioned false-locking that may occur in prior art systems is thus completely impossible in this case.

It should be observed that the clock recovery circuit 36 (which circuit is well known per se) includes logic gates or other functional components that suffer from the drawback of giving rise to a phase offset that is practically fixed.

That is why the microwave signal at the output 39 from the oscillator 13A is not applied directly to the input 14 of the demodulator 11, but is initially processed by an adjustable phase shifter 40 which generates a fixed phase shift under the control of a control voltage V for controlling said phase offset value, the voltage V being applied to a control input 41 of the phase shifter 40.

The fixed phase shift is adjusted to compensate for the above-mentioned phase offset in the loop including the clock recovery circuit 36.

By appropriately adjusting the division numbers N1 and N2 that are common to both synthesizers 1A and 13A, the carrier frequency F can be changed at will, thereby enabling the system to cover a large number of channels.

Figure 6:
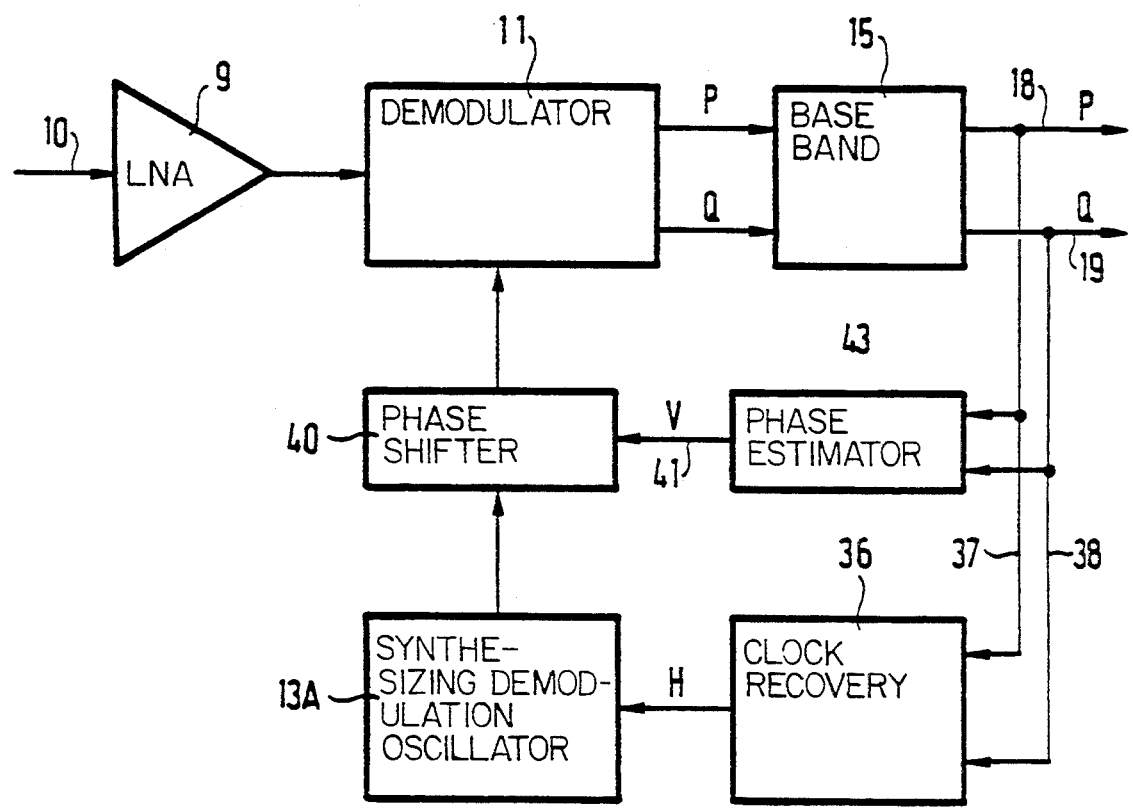
FIG. 6 is a block diagram similar to FIG. 4 showing a slightly improved variant of said receiver.

A slightly improved variant of the receiver is shown in FIG. 6.

In this case, in particular for the purpose of providing automatic servo-control that avoids any need of manual adjustment for the above-mentioned voltage V, and that also serves to compensate for any phase drift that may occur in the loop, e.g. because of temperature variations, the offset voltage V is provided automatically by a phase estimator 43, e.g. similar to the estimator 20 in FIG. 1. The phase estimator 43 is thus controlled by the demodulated data P and Q present on the outputs 18 and 19.

Naturally, the invention is not limited to the embodiment described above. Thus, other types of synthesizer may be used, and the transmission synthesizer 1A and the reception synthesizer 13A may be structurally different provided they are functionally identical, i.e. providing they both use a reference constituted by a multiple or a submultiple of the binary stream clock.

I claim:

1. A digital data transmission system for transmitting data, in particular, by a microwave radio beam, said system comprising:

at least one transmitter for transmitting digital data on a microwave carrier, said transmitter comprising a first frequency synthesizer for generating the microwave carrier frequency, a reference frequency for the first frequency synthesizer being provided by the clock frequency of the digital data to be transmitted; and at least one receiver for receiving said digital data transmitted by said at least one transmitter as a received digital data signal, said receiver comprising:

a demodulator for performing coherent demodulation on said received digital data signal directly at microwave frequency and outputting a demodulated received digital data signal;

a baseband processor for processing in baseband said demodulated received digital data signal and outputting a baseband processed demodulated received digital data signal;

a clock recovery circuit for recovering the clock frequency from the baseband processed demodulated received digital data signal;

another frequency synthesizer operating as a demodulation oscillator to provide an output signal, said another frequency synthesizer being at least functionally identical to the first frequency synthesizer and having its reference frequency provided in similar manner by the clock frequency recovered from the baseband processed demodulated received digital data signal, a frequency of said output signal of said demodulation oscillator being identical to said microwave carrier frequency and being synchronous therewith; and an auxiliary phase offset circuit for receiving the output signal from said demodulation oscillator, and adjusting said output signal to compensate for any phase offsets generated by said clock recovery circuit and to output a control input signal in accordance therewith to the demodulator, said demodulator performing said coherent demodulation in accordance with said control input signal.

2. A digital transmission system as claimed in claim 1, further comprising a phase estimator which receives said baseband processed demodulated received digital data signal and provides an output signal in accordance therewith to control said auxiliary phase offset circuit.

3. A digital transmission system according to claim 1, wherein said first frequency synthesizer comprises a divider for dividing the clock frequency H by a variable number N1, and an adjustable divider for dividing, by a number N2, a portion of the microwave carrier frequency being fed back to be combined with said clock frequency H divided by said divider, so that the microwave carrier frequency F output by the first frequency synthesizer is equal to:

$$F = H \times N2/N1$$

* * * * *